3,293,224
TRIS(2-HYDROXYETHYL)ISOCYANURATE HOMOPOLYMER
Charles B. R. Fitz-William, Jr., Richmond, Va., assignor to Allied Chemical Corporation, New York, N.Y., a corporation of New York
No Drawing. Filed Aug. 5, 1963, Ser. No. 300,054
4 Claims. (Cl. 260—77.5)

This invention relates to tris(2-hydroxyethyl)isocyanurate homopolymer and to a process for production thereof.

Tris(2-hydroxyethyl)isocyanurate may be readily prepared by reacting cyanuric acid with ethylene oxide at temperature of about 25° to 140° C. in the presence of an inert solvent for the cyanuric acid and ethylene oxide and an alkaline catalyst, as disclosed in U.S.P. 3,088,948 of Edwin D. Little and Bing T. Poon, issued May 7, 1963.

In an attempt to prepare tris(2-hydroxyethyl)isocyanurate homopolymer, the monomer was heated at temperature of about 105° to 150° C. Little change in the monomer occurred. When the monomer was heated at temperature of about 150° to 250° C., 2-oxazolidone tended to form. Preparation of 2-oxazolidone by such treatment of the monomer is disclosed and claimed in copending application Serial No. 848,215 of Little and Poon, filed October 23, 1959, now Patent No. 3,108,115.

An object of the present invention is to provide tris(2-hydroxyethyl)isocyanurate homopolymer.

A further object of the invention is to provide a process for producing tris(2-hydroxyethyl)isocyanurate homopolymer.

Other objects and advantages of the invention will appear in the following description.

According to the present invention, tris(2-hydroxyethyl)isocyanurate homopolymer is prepared by heating tris(2-hydroxyethyl)isocyanurate at temperature of 150° to 250° C. in the presence of an etherification-type condensation catalyst. Upon cooling of the resulting viscous liquid, the homopolymer is obtained as a solid resinous product.

It is essential that an etherification-type condensation catalyst be employed to produce the homopolymer of the present invention. These catalysts have high dissociation constants and produce a pH ranging between 0 and 6. Suitable examples of the catalysts include sulfuric acid, phosphoric acid, boron trifluoride and its hydrates, trichloroacetic acid, and aromatic sulfonic acids such as benzenesulfonic acid and toluenesulfonic acid. When other condensation catalysts such as alkaline catalysts are used, the desired solid homopolymer is not formed. For example, use of dilute sodium hydroxide solution as catalyst results in the obtainment of a syrupy product. Use of concentrated sodium hydroxide solution, on the other hand, causes decomposition reactions to occur. Further, negative results are obtained with condensation catalysts such as zinc chloride, stannic chloride, aluminum chloride and boron trifluoride-ether complex.

Although the quantity of catalyst may vary over a wide range, it is preferred to employ the catalyst in amount of about 0.5 to 2% by weight of the tris(2-hydroxyethyl)isocyanurate.

Another essential feature of the process of this invention is maintenance of the polymerization temperature in the range of 150° to 250° C. At temperature below 150° C. little or no reaction occurs, while at temperature above 250° C. the product tends to be colored.

Although it is preferred to employ subatmospheric pressures, atmospheric pressure may be successfully used.

The polymerization time may vary over a wide range depending upon the temperature and catalyst employed. Generally speaking, the polymerization is carried out over a period of about 0.1 to 10 hours or more.

The polymerization is preferably conducted in aluminum-lined reactors since the homopolymer produced does not adhere to aluminum.

The resulting material is a clear viscous liquid which is converted to a clear solid resinous product upon cooling. The product is hard, tough and possesses high resistance to water. It finds utility in the adhesive, coating and molding resin fields.

The following examples, in which parts are by weight, illustrate preparation of tris(2-hydroxyethyl)isocyanurate homopolymer and its conversion into useful products.

*Example 1*

A slurry consisting of 522 parts of tris(2-hydroxyethyl)isocyanurate, 150 parts of water and 6.4 parts of 93% sulfuric acid was placed in an aluminum-lined reactor and heated at 80° to 95° C. for 2½ hours, while maintaining a pressure of 70–80 mm. Hg in the reactor. Substantially all of the water present was removed as vapor leaving colorless crystals of tris(2-hydroxyethyl)isocyanurate plus sulfuric acid in the reactor. The pressure was then lowered to 25 mm. Hg, and the temperature was raised to 150° C. After heating at 150° C. for 6 hours, the resulting material was a clear viscous liquid comprising homopolymer of tris(2-hydroxyethyl)isocyanurate. A clear and colorless, solid resinous product formed when the liquid was cooled. 484 parts of homopolymer were recovered, and the homopolymer was milled to produce a powder passing a U.S. Standard twenty-mesh screen.

Infrared spectra of the homopolymer product showed the presence of ether linkages, major features of the cyanuric ring, and no prominent extraneous absorption peaks. Absorption in the hydroxyl area of the spectrum was low. The absorption characteristics of urethanes, polyethylenimines and oxazolidones were not observed.

*Example 2*

A mixture of 130 parts of tris(2-hydroxyethyl)isocyanurate, 37.5 parts of water and 1.6 parts of 93% sulfuric acid was placed in a reactor provided with a silicon oil heating bath and a water aspirator line containing an ice-cooled water trap. The reactor was rotated under vacuum (about 20 mm. Hg) in the oil bath at 100° C. for 1 hour, during which period 29.2 parts of water collected in the water trap. The reactor was removed from the oil bath, and the bath was heated to 238° C. The reactor was again placed in the oil bath, and heating was continued for 15 minutes at 235–238° C. An additional 14.9 parts of water collected in the water trap. Solid material remaining in the reactor was cooled to room temperature and then removed to give 118.2 parts of slightly yellow solid homopolymer of tris(2-hydroxyethyl)isocyanurate.

The homopolymer was ground and molded at 180–200° C. under pressure to give a clear, slightly yellow disc which was extremely tough.

*Example 3*

About 0.8 part of boron trifluoride dihydrate was added to 13 parts of tris(2-hydroxyethyl)isocyanurate in an aluminum container. The mixture was heated at 20–25 mm. Hg in a vacuum oven. At 132–135° C., the mixture became molten and began to thicken at 155–160° C. The material was then heated at 165° C. for 2 hours to form 12.5 parts of a viscous mass comprising homopolymer of tris(2-hydroxyethyl)isocyanurate. The viscous mass formed a hard, clear and colorless, glass-like resinous material when cooled.

*Example 4*

The homopolymer powder from Example 1 was molded in preheated disc molds at 180° C. The molds were subjected to pressure of 6400 p.s.i. for 15 minutes, cooled and the discs ejected. The molded discs absorbed only about 1% moisture when immersed for 1 hour in boiling water.

*Example 5*

Fiber-glass mats were coated with a solution containing 65% tris(2-hydroxyethyl)isocyanurate, 34% water and 1% sulfuric acid. The sheets were heated in a vacuum oven at 150° C. for one hour, and three-ply laminates were made by pressing at 230° C. to 1250 p.s.i. to form a resinous polymeric product of the tris(2-hydroxyethyl) isocyanurate in situ. The resulting laminate was hard and tough.

Since various changes and modifications may be made in the invention without departing from the spirit thereof, the invention is deemed to be limited only by the scope of the appended claims.

I claim:
1. A method of preparing tris(2-hydroxyethyl)isocyanurate solid resinous homopolymer which comprises heating tris(2-hydroxyethyl)isocyanurate at temperature of 150° to 250° C. in the presence of an acidic etherification-type condensation catalyst.
2. The process of claim 1 wherein the catalyst is sulfuric acid.
3. The process of claim 1 wherein the catalyst is boron trifluoride dihydrate.
4. Solid resinous homopolymer of tris(2-hydroxyethyl)isocyanurate, prepared by the method of claim 1.

References Cited by the Examiner
UNITED STATES PATENTS

| | | | |
|---|---|---|---|
| 2,965,614 | 12/1960 | Shashoua | 260—77.5 |
| 3,037,979 | 6/1962 | Fukui et al. | 260—248 |
| 3,088,948 | 5/1963 | Little et al. | 260—248 |
| 3,097,191 | 7/1963 | France | 260—77.5 |
| 3,108,115 | 10/1963 | Little et al. | 260—307 |

LEON J. BERCOVITZ, *Primary Examiner.*

DONALD E. CZAJA, *Examiner.*

J. J. KLOCKO, *Assistant Examiner.*